United States Patent [19]

Alt

[11] 4,323,409
[45] Apr. 6, 1981

[54] APPARATUS AND METHOD FOR FORMING DIELECTRICALLY SEALED LAMINAR SHEET MATERIALS

[75] Inventor: Rudolph Alt, Methuen, Mass.

[73] Assignee: The General Tire & Rubber Company, Akron, Ohio

[21] Appl. No.: 125,499

[22] Filed: Feb. 28, 1980

[51] Int. Cl.³ .............................................. B31F 1/00
[52] U.S. Cl. ................................. 156/219; 156/380.4; 156/519; 156/521; 156/272; 226/162
[58] Field of Search ............... 156/273, 380, 579, 516, 156/521, 522, 219, 220; 226/162

[56] References Cited

U.S. PATENT DOCUMENTS

| | | | |
|---|---|---|---|
| 2,025,755 | 12/1935 | Lyle | 226/162 X |
| 2,988,129 | 6/1961 | Kevelin et al. | 156/522 X |
| 2,994,360 | 8/1961 | Shaw et al. | 156/273 X |
| 3,010,866 | 11/1961 | Douchet | 156/219 |
| 3,516,892 | 6/1970 | Becka | 156/522 |

Primary Examiner—David A. Simmons
Attorney, Agent, or Firm—Pearne, Gordon, Sessions, McCoy & Granger

[57] ABSTRACT

An apparatus and method are disclosed for forming laminar sheet materials comprising a base material having overlay strap material dielectrically sealed thereto at spaced locations along the length of the base material. In accordance with the method, the strap material is positioned under tension adjacent an electrode bar for dielectric sealing to the base material and the lateral edges of the strap material are confined between retractable guides extending along the sides of the electrode bar. The strap material is tensioned and laterally confined until it is fixed to the base material by dielectric sealing. A dielectric sealing press including a strap feeder for tensioning and confining the strap material is also disclosed.

33 Claims, 11 Drawing Figures

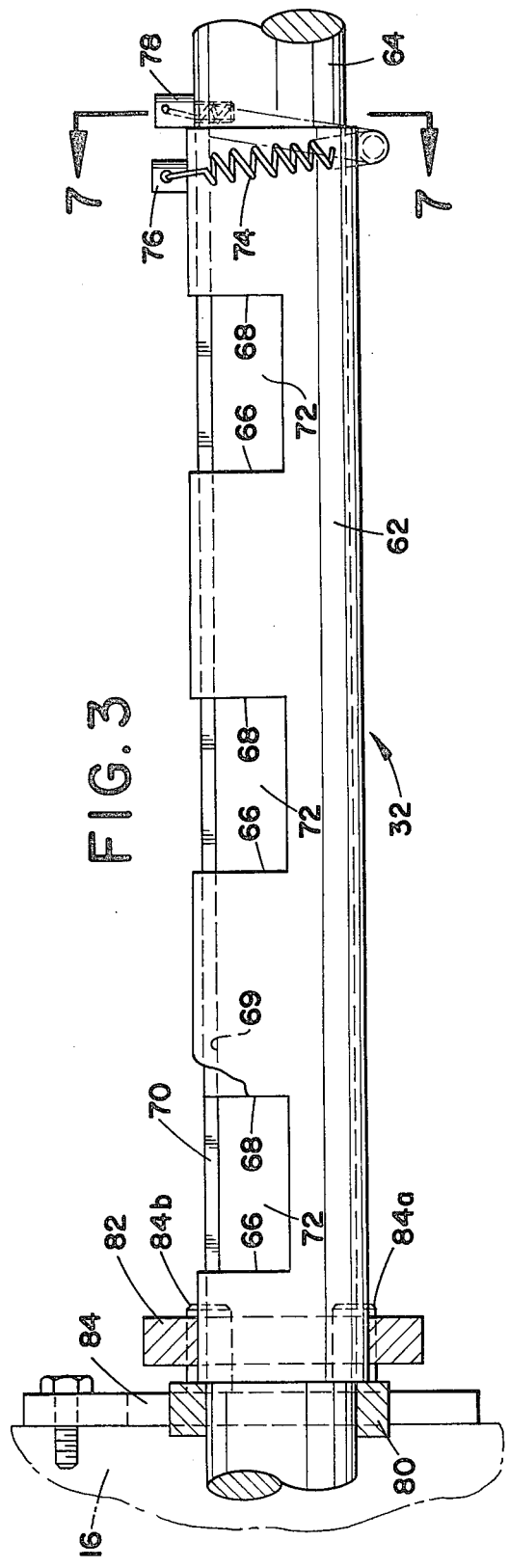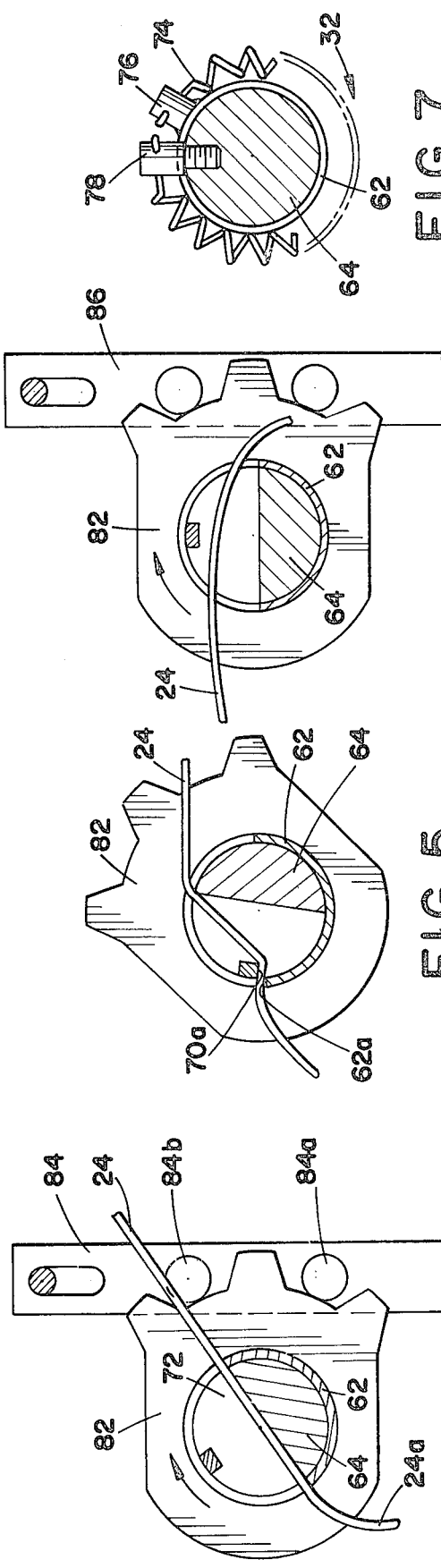

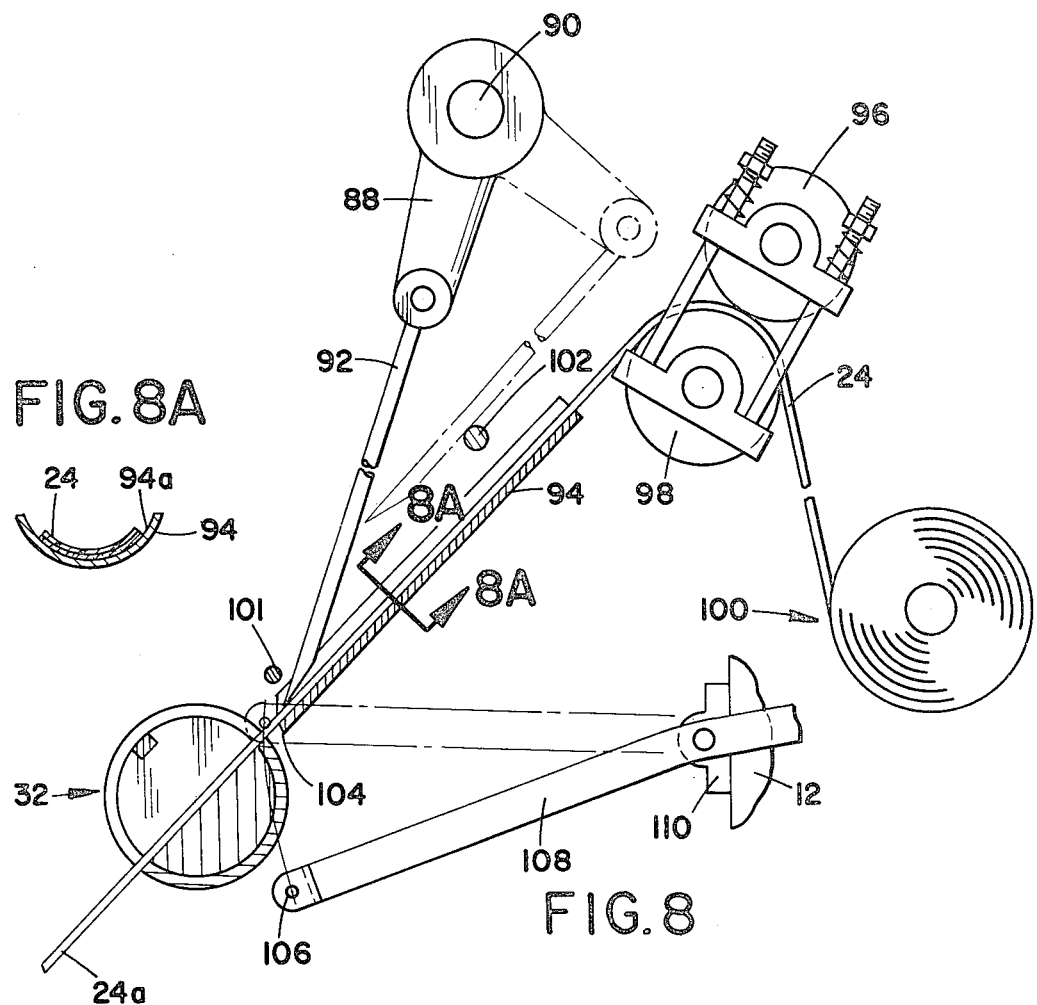
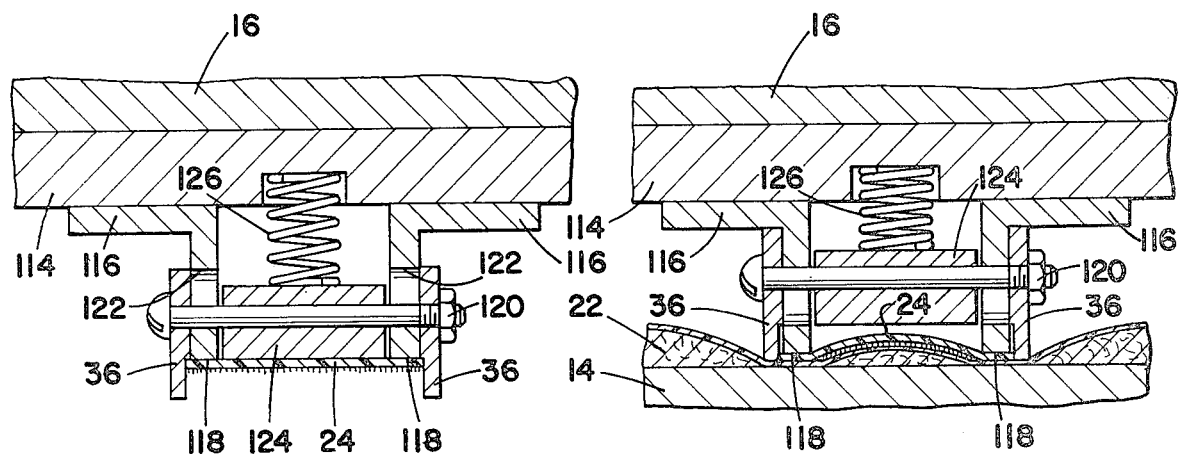

APPARATUS AND METHOD FOR FORMING DIELECTRICALLY SEALED LAMINAR SHEET MATERIALS

BACKGROUND OF INVENTION AND PRIOR ART

The present invention relates to an apparatus and method for forming laminar sheet or sheeting materials useful as upholstery and, more particularly, to sheet material having transversely extending overlay straps of dielectrically heat sealable material bonded thereto.

The laminar sheet materials may be formed of plastic and/or fabric layers of conventional composition as described below in greater detail, and the base material and strap material may be provided with a woven or non-woven fabric backing. Accordingly, the base material and/or the strap material may comprise a single or multi-ply construction. A wide range of plastic and fabric materials may be used provided the strap material is dielectrically heat sealable to the base material.

The laminar sheet materials are preferably relatively flexible and provided in roll stock form for convenience of use in subsequent applications. Accordingly, the laminar sheet materials are themselves formed of flexible base sheet materials and overlay strap materials which require web-type handling procedures and present special dielectric sealing problems. Thus, the production of the laminar sheet materials requires an efficient combination of the web handling and dielectric sealing techniques to provide an economically satisfactory product. The transverse orientation of the overlay strap material with respect to the length of the base sheet material is a further constraint in the economic resolution of these problems, since it requires an intermittent sealing procedure.

The dielectric heat sealing of plastic materials to provide decorative upholstery materials is known, and a variety of techniques may be used to form such materials in a continuous manner when continuous layers of materials are bonded or sealed in a lengthwise or machine direction. However, the provision of lengthwise discontinuous or transversely extending bonding and layers is typically only achieved through manual operator layup techniques. The use of manual layup or positioning techniques for lengthwise discontinuous layers is often the result of the difficulties in handling finite lengths or inserts of plastic materials due to their inherent tendency to curl, coil, or otherwise assume a nonplanar configuration. The discontinuous layers or strap material herein is typically provided by cutting a large web of material to proper dimensions, and the tendency to assume a nonplanar configuration is associated with the stresses resulting within the cut material.

An automated apparatus and method for dielectric sealing and embossing of a plastic thread in a transverse direction across the width of a base material are disclosed in U.S. Pat. No. 2,994,360, assigned to the assignee herein, the teachings of this patent being incorporated by reference. In this prior art technique, a thread feed mechanism traveling along a circular path is used to grip the ends of a length of thread which is to be dielectrically sealed to the base material in order to align the thread and pregrip the thread end adjacent the thread supply for use in the next dielectric sealing cycle.

SUMMARY OF THE INVENTION

The present invention provides an apparatus and method for forming laminar sheet material comprising a base material having overlay strap material dielectrically heat sealed to the base material at spaced locations along its length. The apparatus and method are particularly adapted to the use of intermittent feeds of base and strap materials from roll supplies thereof and, accordingly, the laminar sheet material is readily provided as roll stock of arbitrary length.

In accordance with the invention, the strap material is tensioned along its length as it is positioned for dielectric sealing to assure its proper orientation and to prevent the curling or coiling thereof due to any inherent stresses in the strap material. The strap mterial is also confined along its lateral edges as it is positioned for sealing to prevent the lateral shifting or misalignment of the strap material itself. The tensioning and lateral confining of the strap material are preferably maintained until the strap material is fixed to the base material by dielectric sealing.

In the illustrated embodiment, the strap material extends across the width of the base material. The base material is advanced lengthwise in predetermined increments through a dielectric sealing apparatus having a plurality of electrode bars extending in a direction across the width of the base material. A tensioned supply of strap material is provided for each electrode bar.

A grab bar is used in the feeding of the strap material. The grab bar is operable between an opened position for receiving or releasing strap material and a closed position for grasping the strap material. The grab bar is arranged to reciprocate back and forth across the width of the base material from a strap feed station to a strap seal station. A threader is provided at the strap feed station to feed free ends of strap material extending from the tensioned supplies thereof to the grab bar in its opened position. The grab bar is operated to its closed position to grasp the free ends and advanced toward the strap seal station to pull predetermined lengths of strap material from the supplies thereof and position the tensioned strap material along the sealing surfaces of the electrode bars. At the strap seal station, the grab bar holds the strap material under tension against the electrode bars for dielectric sealing.

Each of the electrode bars has retractable strap aligning guides for confining and aligning the lateral edges of the strap material as it is being positioned along the electrode sealing surface by the grab bar. The retractable guides project beyond the sealing surface of each of the electrode bars a sufficient distance to assure the proper positioning of the strap material. The retractable guides are displaced to their retracted position by the closing pressure of the electrode against the base material during dielectric sealing.

Following the dielectric sealing, the strap material is severed adjacent the supplies thereof to provide further free ends of strap material, and the grab bar is operated to release the free ends of the strap material which has been sealed to the base material. The cycle is repeated with the return of the grab bar.

In contrast with prior art techniques, the apparatus and method of the present invention enable the efficient production of laminar sheet material having lengthwise discontinuous layers such as the illustrated overlay strap material dielectrically sealed to a base material. The improvements herein are associated with the effective use of tension to position the strap material and control its orientation. More particularly, the strap material is sufficiently tensioned to cause it to assume a substantially planar configuration between the electrode bar and base material and, preferably, the strap material is biased against the sealing surfaces of the electrode bar by tensioning the strap material between points which are offset or spaced from the plane of the electrode bar sealing surfaces.

BRIEF DESCRIPTION OF THE DRAWINGS

FIG. 3 is an elevational view, on an enlarged scale, of a grab bar used in the feeding of strap material in the apparatus shown in FIG. 1;

FIG. 4 is a cross sectional view of the grab engaging a first opener at a strap feed station;

FIG. 5 is a cross sectional view of the grab bar in a closed position grasping strap material;

FIG. 6 is a cross sectional view of the grab bar engaging a second opener at a strap seal station;

FIG. 7 is a cross sectional view, taken along the line 7—7 in FIG. 3;

FIG. 8 is an elevational view partially in section, showing a threader for feeding strap material to the grab bar at the strap feed station;

FIG. 8A is a sectional view along the line 8A—8A in FIG. 8;

FIG. 9 is a cross sectional view of an electrode bar having retractable guides; and FIG. 10 is a cross sectional view similar to FIG. 9, showing the electrode bar in a sealing position.

DETAILED DESCRIPTION OF THE DRAWINGS

Figure 1:
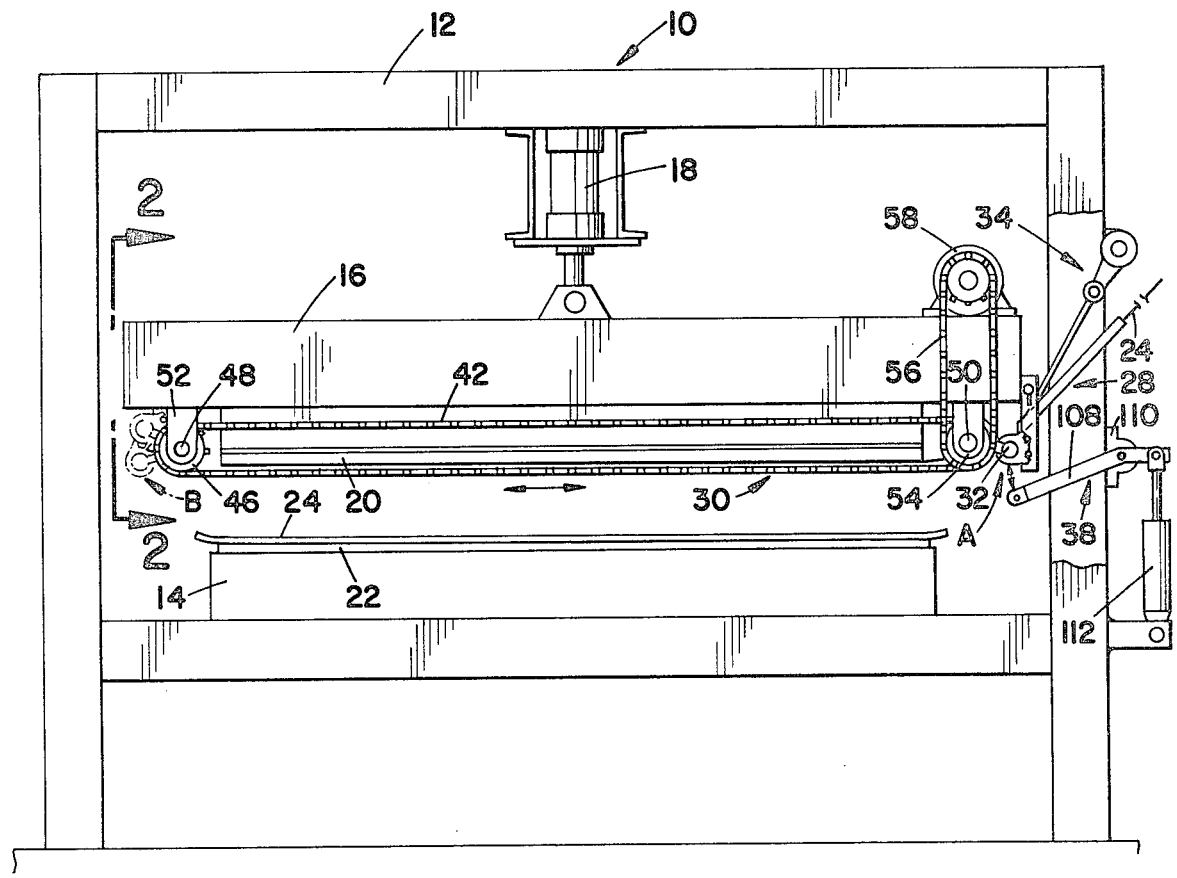
FIG. 1 is a front elevational view of an apparatus for making laminar sheet material in accordance with the present invention.
Figure 2:
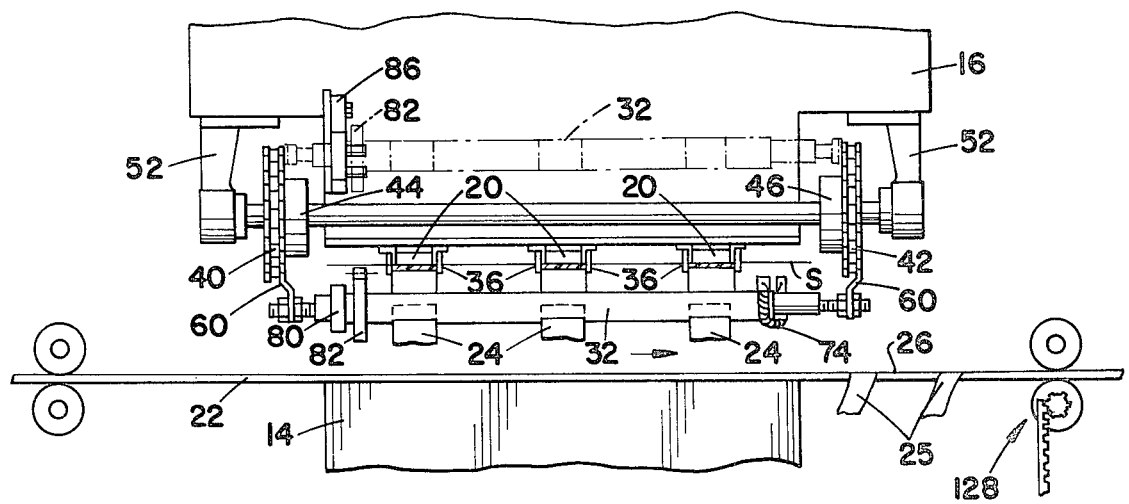
FIG. 2 is a fragmentary, side elevational view, on an enlarged scale, taken along line 2—2 in FIG. 1.

Referring to FIGS. 1 and 2, a press 10 having a stationary, rectangle-shaped frame 12 is shown. The press 10 includes a fixed platen 14 mounted to a lower, horizontally extending member of the frame 12. A movable platen 16 is supported above the fixed platen 14 by a hydraulic cylinder 18 which is suspended from an upper, horizontal member of the frame 12. The movable platen 16 has three electrode bars 20 (FIG. 2) mounted to its lower surface for purposes of dielectric sealing. The electrode bars 20 extend along the width of the platen 16 and the sealing surfaces of the electrode bars are disposed in a plane indicated by the line S (FIG. 2) adjacent the fixed platen 14.

The press 10 is shown in FIG. 1 in an opened position, with the platens 14 and 16 being spaced from one another for purposes of material feed. To that end, a base sheet or sheeting material 22 is advanced lengthwise in predetermined increments over the fixed platen 14 and overlay strap material 24 is positioned across the electrode bars 20 for dielectric sealing to the base material to provide laminar sheet or sheeting material 26.

A strap feeder assembly 28 is provided for purposes of feeding and positioning the strap material 24 for dielectric sealing to the base material 22. The strap feeder assembly 28 includes as its principal elements a traveler 30, a grab bar 32, a strap threader 34, retractable guides 36 positioned along the electrodes 20, and a strap cutoff 38. The cooperation of these elements to feed and position strap material in timed relationship with the operation of the press 10 and advancement of the base material 22 is described below. In the following description, it is to be understood that identical feeds of strap material are provided for each of the three electrodes with duplication of specific components of the strap feeder assembly as required.

The traveler 30 comprises a pair of spaced conveyor chains 40 and 42. The conveyor chain 40 travels about a pair of spaced sprockets 44, only one being shown in FIG. 2, disposed adjacent opposite ends of the platen 16. Similarly, the conveyor chain 42 travels about a pair of spaced sprockets 46, only one of which is shown in FIG. 1, and the sprockets 46 are again disposed at opposite ends of the platen 16. Adjacent pairs of the sprockets 44, 46 are carried by and keyed to shafts 48 and 50, which are supported by depending bearing supports 52 mounted to the platen 16. The conveyor chains 40 and 42 are driven by a single drive sprocket 54 which is positioned outboard of the sprocket 46 on the shaft 50, as shown in FIG. 1. The sprocket 54 is driven by a drive chain 56 extending from a drive motor 58 mounted on an upper surface of the platen 16. The drive motor 58 is reversible, and it is operated to drive the roller chains 40, 42 in a first direction and in an opposite second direction to reciprocate the grab bar 32 across the width of the base material 22.

As indicated above, the grab bar 32 is carried by the traveler 30 for purposes of feeding and positioning the strap material 24. More particularly, the grab bar is reciprocated between a strap feed station indicated by the letter A at the right in FIG. 1 (the grab bar 32 being shown in solid line at the feed station A) and a strap seal station indicated by the letter B at the left in FIG. 1 (the grab bar being shown in phantom outline at the seal station B). To that end, the grab bar 32 is mounted between the conveyor chains 40 and 42 by a pair of attachment links 60 for movement therewith.

Referring to FIG. 3, the grab bar 32 includes an outer cylindrical, sleeve member 62 which telescopically receives an inner cylindrical, bar member 64. The bar member 64 extends beyond the ends of the sleeve member 62, as shown in FIG. 2, and the ends of the member 64 are connected to the links 60 so as to fix the bar member against rotation.

The sleeve member 62 has three longitudinally spaced apertures or recesses 66, each of the apertures extending around approximately one-half of the peripheral circumference of the member 62. The bar member 64 has three similar apertures or recesses 68 which are in register with the apertures 66 in the sleeve member 62. Further, the bar member 64 includes a longitudinally extending recess 69 for receiving a key 70. The key 70 is positioned at about the midpoint of the arcuate, peripheral extent of the apertures 68. As best shown in FIG. 3, the apertures 66 and 68 cooperate with the key 70 to define three longitudinally spaced grab bar openings 72. The grab bar openings 72 are each of sufficient width or longitudinal extent to receive the strap material 24 and each of the openings is associated with one of the electrode bars 20 for positioning strap material therealong.

The grab bar 32 is operable between an opened position with the apertures 66 and 68 being peripherally aligned as shown in FIG. 3 to define the grab bar openings 72, and a closed position with the apertures 66 and 68 being substantially rotated out of peripheral register for entrapping the strap material 24 as shown in FIG. 5.

In the closed position, the strap material is grasped between a first gripping surface 62a which partially defines the aperture 66 of the sleeve member 62 and a second gripping surface 70a which partially defines the aperture of the bar member 64. The grab bar 32 is normally biased to the closed position by a spring 74 which is wound around one end of the grab bar. One end of the spring 74 is secured to the sleeve member 62 by a screw 76, and the other end of the spring is secured to the bar member 64 by a screw 78 as shown in FIG. 7. The screw 78 also serves to cooperate with a collar 80 to longitudinally fix the position of the sleeve member 62 with respect to the bar member 64.

The grab bar 32 is operated to its opened position by means of a gear collar 82 which is fixed to the sleeve member 62. The gear collar 82 cooperates with grab bar openers 84 and 86, which are respectively secured to the platen 16 adjacent opposite ends of the conveyor chain 40. The mounting of the grab bar opener 86 to the platen 16 is shown in FIG. 2 and the position of the grab bar 32 upon engagement with the opener is shown in phantom outline. It should be appreciated that the opener 84 is similarly mounted to the other end of the platen at a slightly lower position to move the grab bar to its open position at strap seal station A.

Referring to FIG. 4, the gear collar 82 is shown fully engaged with the opener 84 to dispose the grab bar 32 in its opened position, as occurs at the feed station A. As the grab bar approaches the feed station A, the grab bar is in the closed position and the gear collar 82 is in the orientation shown in FIG. 5. as it travels along the lower run of the conveyor chains 40, 42. As the grab bar begins its arcuate, upward travel along the ends of the conveyor chains 40, 42, the gear collar 82 first engages a lower pin 84a and begins to rotate in a clockwise direction, as shown in FIG. 4. The sleeve member 62 of the grab bar is rotated with the gear collar 82 about the bar member 64, which is fixed against rotation by its attachment to the conveyor chains. Actuation of the gear collar 82 continues with the engagement of the pin 84b as the grab bar is fully opened and positioned at the feed station A. Upon travel of the grab bar in the reverse direction along the path of the conveyor chains 40, 42, it will move to the closed position as it disengages the opener 84.

The opener 86 cooperates with the gear collar 82 in a manner similar to that described above with respect to the opener 84. In this instance, the opener 86 is initially engaged as the grab bar moves from the strap seal station B in a clockwise direction along the arcuate portion of the run of the conveyor chains 40, 42. When the grab bar reaches the position shown in phantom outline in FIG. 2, the grab bar is fully engaged with the opener 86. Accordingly, the grab bar is in its opened position for releasing the end of the strap material 24 which is pulled out of the grab bar opening 72 by the relative upward movement of the grab bar with respect to the base material 22, the strap material having been bonded thereto. The direction of the drive of the conveyor chains is then reversed to return the grab bar to the strap feed station A.

Referring to FIG. 8, the strap threader 34 is shown in greater detail. The threader 34 includes a feed crank 88 carried on a shaft 90 which is driven by suitable drive means such as an electric motor and clutch (not shown) to intermittently feed strap material to the grab bar. To that end, a pusher member 92 is connected to the crank 88 and, upon rotation of the crank, the pusher member is arranged to frictionally engage strap material 24 positioned on an inclined support 94. The strap material 24 extends from the tensioned supply thereof provided by the spring-biased feed rolls 96 and 98, between which the strap material passes from roll supplies 100 thereof. In the illustrated apparatus, three crank and pusher members are provided for simultaneously feeding strap material from three roll supplies thereof.

The crank 88 and the pusher member 92 are shown at the start of the feed cycle in phantom outline in FIG. 8. At the start of the feed cycle, the free end of the strap material 24 extends below a retaining rod 101 which may be mounted to the support 94 and slightly beyond the feed edge 104 of the inclined support in a position clear of the grab bar 32 and aligned with the grab bar opening 72. As the crank 88 rotates in a counterclockwise direction, a pin 102 serves to prevent the pusher member from engaging the strap material until the crank has reached its uppermost position and the pusher member is substantially extending vertically downward. As the crank continues to rotate, the pusher member 92 engages the strap material adjacent an intermediate point along the length of the support 94, and the lower end of the pusher member frictionally advances the strap material downwardly along the support 94 as the crank 88 rotates to the solid-line position shown in FIG. 8. As the strap material is advanced, a free end 24a thereof is received within the opening 72 of the grab bar 32. The continued rotation of the crank 88 pivots the pusher member 32 over the pin 102 and clear of the strap material. The crank continues to rotate to the phantom outline position shown in FIG. 8, and it rests there until the next feed cycle begins.

As shown in FIG. 8A, the support 94 has an arcuate, troughlike surface 94a, and the strap material assumes the arcuate configuration thereof. The free end 24a of the strap material is caused to assume the arcuate configuration in order to provide it with sufficient rigidity to allow it to project in a linear manner over the feed edge 104 and into the grab bar opening 72.

Referring to FIGS. 1 and 8, the strap cutoff 38 comprises an electrical resistance wire 106 carried by a pivoting yoke 108. The yoke 108 is supported by a bracket 110 mounted to the frame 12. The remote end of the yoke 108 is connected to a pneumatic cylinder 112 to provide the pivoting movement of the yoke and to position the electrical resistance wire 106 in a strap cutoff position as shown in phantom outline in FIG. 8 while the platens 14 and 16 are in their closed position immediately following the dielectric sealing of the strap material.

The yoke 108 and the wire 106 are dimensioned to simultaneously cut off the strap material extending to each of the electrode bars 20 after dielectric sealing. The strap material is cut off adjacent the feed edge 104 to provide a further free end 24a extending slightly beyond the edge 104. It should be appreciated that the grab bar 32 is actually adjacent the strap seal position B when the strap material is cut off and that it does not interfere with the pivoting movement of the yoke 108. After the strap material has been cut, the yoke 108 is returned to its rest or idle position shown in solid lines in FIG. 8 which is clear of the path of travel of the grab bar.

Referring to FIG. 9, one of the electrode bars 20 is shown with its rectractable guides 36 in an extended position for aligning the strap material 24. In the illustrated embodiment, the three electrode bars 20 are mounted in parallel relationship to a die plate 114, which in turn is secured to the platen 16.

Each of the electrode bars 20 comprises a pair of L-shaped electrodes 116 having one leg thereof secured to the die plate 114 and the other leg extending downwardly to provide the electrode sealing surfaces 118. A retractable guide 36 is secured to each of the depending legs of the electrodes 116 by threaded fasteners 120 extending through slots 122 in each of the legs. The fastener 120 passes through a bore in a central pusher bar 124, which biases the retractable guides 36 to their extended position by means of a compression spring 126. The pusher bar 124 extends along the length of the electrodes 116 and a plurality of springs 126 and fasteners 120 are used to assure uniform movement of the guides 36.

The electrode bar 20 is shown in a dielectric sealing position in FIG. 10. As shown, the guides 36 are retracted by the closing pressure of the platens and the electrode sealing surfaces 118 are exposed to dielectrically seal each edge of the strap material 24 to the base material 22.

The operation of a dielectric sealing cycle of the press 10 is described below with reference to all of the figures. For purposes of clarity, the electrical controls associated with various elements of the press and strap feed assembly are not described in detail, since such controls are known in the art as illustrated in U.S. Pat. No. 2,994,360. Generally, electrical control is achieved through the use of cam-operated microswitches and the use of limit switches at the ends of the strokes of various reciprocating components to coordinate the operation of the press elements after it has been initially actuated by an operator. In a like manner, a timing relay or switch may be used for controlling the period of the application of the dielectric sealing current in accordance with the materials being sealed.

As shown in FIG. 1, the platens 14,16 are in an opened position and the grab bar 32 is at the strap feed station A in an open condition. The base material 22 is incrementally advanced to dispose a portion thereof between the platens for bonding of the strap material 24. The advance of the base material 22 may be provided by initially passing the base material through a ratchet-driven feed roll assembly 128, as schematically shown in FIG. 2.

Following the advance of the base material 22, or concurrently therewith, the strap threader 34 is operated to feed the free ends 24a of the strap material into the grab bar openings 72, which are aligned therewith. The travel of the grab bar 32 to the strap seal station B then begins by operation of the motor 58 to advance the conveyor chains 40, 42 in a clockwise direction as viewed in FIG. 1. As the grab bar 32 initially moves downwardly along the arcuate end of the conveyor chains 40, 42, adjacent the feed station A, the opener 84 is disengaged and the grab bar is moved to the closed position by the spring 74 to entrap and grasp the free ends of the strap material. As the grab bar continues to travel along the lower run of the conveyor chains 40, 42, predetermined lengths of strap material are pulled under tension from the supply rolls 100 as the strap material passes between the spring-biased rollers 96, 98.

As the grab bar passes below the electrode bars 20, the strap material is partially received between the guides 36 of each of the electrode bars at the ends thereof adjacent the threader 34 as the strap material is pulled around the retainer rod 101 (FIG. 8) which is positioned above the sealing surfaces of the electrode bars. The operation of the motor 58 and the advance of the grab bar are terminated by operation of a limit switch when the grab bar reaches the strap seal station B. In this position, the grab bar tensions the strap material against the electrode sealing surfaces 118 of the electrodes 20 in a substantially planar condition. The positioning of the strap material against the sealing surfaces 118 is assured by tensioning the ends of the strap material between points located above the plane S (FIG. 2) of the sealing surfaces. More particularly, one end of the strap material is drawn about the retaining rod 101 positioned adjacent the strap feed station A and the other end is supported by the grab bar 32 positioned at the strap seal station B. The retaining rod 101 may be omitted in some applications, and the strap material may be drawn or tensioned around the pin 102 which is also located above the planes of the sealing surfaces of the electrodes. In FIG. 2, it should be appreciated that the solid line showing of the grab bar is at a position in advance of the seal station B, and that the grab bar is actually above the plane S which it is at the seal station B.

The press 10 is then operated to close the platens 14 and 16 and the dielectric sealing cycle occurs. The electrode bars 20 and the platen 14 are used as opposing electrodes for a dielectric heating system and they are connected to a suitable high frequency generator (not shown). The dielectric heating is used to bond the edges of the strap material 24 adjacent the electrode sealing surfaces to the base material 22.

Following the dielectric sealing, the motor 58 is again actuated to drive the conveyor chains 40, 42 in a clockwise direction, as shown in FIG. 1, to cause the grab bar to engage the opener 86, which is located adjacent the strap seal station B. The upward travel of the grab bar 32 along the arcuate end run of the conveyor chains causes the free ends 24a of the strap material 24 to be withdrawn from the grab bar openings 72 since the strap material has now been sealed to the base material 22 lying across the lower platen 14. Concurrently therewith, the strap cutoff 38 is operated to the position shown in phantom outline in FIG. 8 to sever the strap material adjacent the feed edge 104 of the threader 34 and thereafter returned to its rest or idle position shown in solid line. Accordingly, a short length of strap material extends from each end of the three overlay straps which have just been bonded to the base material. In FIG. 2, two such lengths of strap material are diagrammatically illustrated at 25. The protruding lengths of strap material are cut from the laminar material 26 in a subsequent trimming process.

The press 10 is then operated to open the platens 14 and 16, and the grab bar 32 is returned along the lower run and portions of the arcuate end runs of the conveyor chains 40, 42 to the strap feed station A. During the return of the grab bar, the opener 86 is disengaged following the release of the strap material and the grab bar returns to its closed position. As the grab bar begins to travel along the arcuate path of the conveyor chains 40, 42 adjacent the feed station A, the opener 84 is engaged and the grab bar is moved to its open position as it comes to rest at the strap feed station A. The material feed and dielectric sealing steps are then repeated in a further cycle of the press.

As previously indicated, a wide range of materials may be used in accordance with the present invention provided that they are dielectrically heat sealable. Suitable plastic materials are relatively flexible and they may contain plasticizers for this purpose. Examples of suitable plastics include polyvinyl chloride, polyvinylidene chloride, polyvinyl chloride-vinyl acetate copolymers, vinyl chloride-vinylidene chloride copolymers, and mixtures of the foregoing.

The strap and base materials may be provided with a woven or non-woven fabric backing of natural or synthetic fiber. Examples of suitable fibrous backing materials are cotton fabric, rayon fabric, felt, paper, and a rayon fabric mixture with a high strength synthetic fiber such as nylon or polyethylene terephthalate. Further, a thin plastic film layer may be included to cover the exposed non-woven backing material. In the illustrated embodiment, the strap material 24 is provided with a non-woven backing of synthetic fiber (FIG. 9) and the base material 22 is provided with a relatively heavier non-woven backing of the same fiber, as best shown in FIG. 10.

Alternatively, one of the components of the laminar material 26 may itself comprise a fabric. For example, automobile seat upholstery materials have been provided using a velour fabric as a base material having a non-woven synthetic fiber backing and a plastic overlay strap material formed of a vinyl plastic and having a knit fabric backing.

The press 10 and strap feeder assembly 28 may be modified to handle base and strap materials of various widths. Generally, the base materials and final laminate material will be 60 inches wide, but the strap material width may range from less than one inch in width to several inches or more in width and these different sized materials are accommodated with appropriate dimension changes in the threader, grab bar and electrodes.

Although the preferred embodiment of this invention has been shown and described, it should be understood that various modifications and rearrangements of the parts may be resorted to without departing from the scope of the invention as disclosed and claimed herein.

What is claimed is:

1. In an apparatus for dielectrically sealing a strap of relatively flexible material to a base sheeting material of predetermined width and arbitrary length comprising a press including a first platen having an electrode bar mounted thereto and a second platen, said platens being operable between an opened position for material feed and a closed position for dielectric sealing, dielectric sealing means connected between said electrode bar and second platen, means for advancing said base material lengthwise in predetermined increments between said platens and transversely of said electrode bar, the improvement comprising a strap feeder assembly for feeding said strap material between said electrode bar and base material in correlation with the operation of said platens, said strap feeder assembly including a grab bar arranged to reciprocate back and forth across the width of said base material, strap threader means arranged to feed a free end of said strap material extending from a tensioned supply thereof to said grap bar, said grab bar having relatively movable first and second members arranged to grasp said free end of said strap material and to pull a predetermined length of said strap material from said supply thereof across the width of said base material to position and hold said strap material in a tensioned condition adjacent said electrode bar for dielectric sealing to said base material.

2. An apparatus as set forth in claim 1, wherein said strap feeder assembly includes traveler means to provide said reciprocating movement of said grab bar, said traveler means being arranged to carry said grab bar from a strap feed station adjacent a first lateral edge of said base material to a strap seal station adjacent an opposite second lateral edge of said base material.

3. An apparatus as set forth in claim 2, wherein said first platen is movable and said second platen is fixed, and said traveler means is adapted to be mounted to said first platen for movement therewith.

4. An apparatus as set forth in claim 2, wherein said first and second members of said grab bar are relatively movable between an opened position for receiving or releasing said strap material and a closed position for grasping said strap material.

5. An apparatus as set forth in claim 4, wherein said first and second members cooperate in said opened position to provide an opening for receiving or releasing said strap material and, in said closed position, said first and second members cooperate to substantially close said opening to entrap said free end therein.

6. An apparatus as set forth in claim 5, wherein said first member telescopically receives and overlies said second member, each of said members having a peripherally extending aperture which is at least partially defined by a gripping surface, said apertures being in register, and said gripping surfaces being relatively spaced apart in said opened position and being substantially adjacent in said closed position.

7. An apparatus as set forth in claim 5, wherein a plurality of said electrode bars are mounted to said first platen and said first and second members of said grab bar cooperate to define a plurality of said openings, each of said openings being associated with one of said electrode bars, and said tensioned supply of strap material provides a plurality of said free ends, each of said free ends being associated with one of said openings and its associated electrode bar.

8. An apparatus as set forth in claim 3, wherein said traveler means comprise a pair of spaced apart, endless conveyor chains having an elongated run extending across the width of said base material, said grab bar being mounted between said conveyor chains, and means to drive said conveyor chains in a first direction and in an opposite second direction to provide said reciprocating movement of said grab bar.

9. An apparatus as set forth in claim 8, wherein said reciprocating movement of said grab bar is provided by travel of the grab bar along a lower run of said conveyor chains, and a portion of an arcuate run adjacent each end of said lower run.

10. An apparatus as set forth in claim 9, wherein said first and second members of said grab bar are normally resiliently biased to said closed position, and actuation means operable between said grab bar and first platen are provided for moving said first and second members to said opened position as said grab bar travels along said arcuate run portions.

11. An apparatus as set forth in claim 1, wherein said strap threader includes a surface arranged to support said free end of said strap material, said surface terminating at a feed edge, and a pusher member arranged to frictionally advance said material along said surface and over said feed edge to said grab bar.

12. An apparatus as set forth in claim 4, wherein said strap threader is arranged to feed said free end of said strap material to said first and second members of said grab bar in said opened position, said strap threader comprising a surface arranged to support said free end of said strap material extending from said tensioned supply thereof, said surface having a feed edge disposed adjacent said first and second members in said strap feed station, and a pusher member arranged to frictionally engage and advance said strap material along said surface to extend said free end therefrom over said feed edge to said first and second members of said grab bar at said strap feed station.

13. An apparatus as set forth in claims 1, 3, or 11, wherein said electrode bar includes sealing surface means and said strap feeder assembly includes retractable strap aligning guides extending along opposite sides of said electrode bar, said guides projecting from said electrode bar beyond said sealing surface means to receive and align said strap material with said sealing surface means of the electrode bar and to retract during dielectric sealing.

14. An apparatus as set forth in claims 1, 3, or 11, wherein said strap feeder assembly includes strap severing means for severing said strap material adjacent said tensioned supply thereof after dielectric sealing to provide a further free end of said strap material.

15. An apparatus as set forth in claims 1, 3 or 11 wherein said electrode bar includes sealing surfaces disposed in a plane and said strap feeder assembly is arranged to tension said strap material between points offset from the plane of said sealing surfaces to bias said strap material against said sealing surfaces.

16. In an apparatus for dielectrically sealing a strap of relatively flexible material to a base sheeting material of predetermined width and arbitrary length comprising a press including a first platen having an electrode bar mounted thereto and a second platen, said platens being operable between an opened position for material feed and a closed position for dielectric sealing, dielectric sealing means connected between said electrode bar and second platen, means for advancing said base material lengthwise in predetermined increments between said platens and transversely of said electrode bar, the improvement comprising a strap feeder assembly for feeding said strap material between said electrode bar and base material in correlation with the operation of said platens, said strap feeder assembly including traveler means arranged to reciprocatingly carry a grab bar between a strap feed station adjacent a first lateral edge of said base material and a strap seal station adjacent an opposite second lateral edge of said base material, said grab bar having relatively movable first and second members arranged to grasp a free end of said strap material extending from a tensioned supply thereof and to pull a predetermined length of said strap material from said supply thereof across the width of said base material to position said strap material in a tensioned condition adjacent said electrode bar for dielectric sealing to said base material, said first and second members being telescopically arranged and relatively rotatable between an opened position and a closed position, said first and second members cooperating in said opened position to provide an opening for receiving or releasing said strap material and, in said closed position, said first and second members cooperating to substantially close said opening to entrap said free end therein.

17. An apparatus as set forth in claim 16, wherein said first and second members are normally resiliently biased to said closed position.

18. An apparatus as set forth in claim 8, wherein said strap feeder assembly includes actuation means to operate said grab bar to said opened position adjacent said strap feed and strap seal stations.

19. An apparatus for dielectrically sealing a strap of relatively flexible material to a base sheeting material of predetermined width and arbitrary length comprising a press including a frame for supporting a fixed platen and a movable platen having an electrode bar mounted thereto, said platens being operable between a spaced open position for material feed and a substantially adjacent closed position for dielectric sealing, dielectric heat sealing means connected between said electrode bar and fixed platen, means for advancing said base material in a lengthwise direction in predetermined increments along said fixed platen and transversely of said electrode bar, and a strap feeder assembly to feed and position strap material in alignment with said electrode bar for dielectric sealing to said base material, said strap feeder assembly comprising traveler means mounted to said movable platen for movement therewith and arranged to reciprocate a grab bar back and forth between a strap feed station and a strap seal station which are located adjacent opposite lateral edges of said base material, strap threader means arranged to feed a free end of said strap material extending from a tensioned supply thereof to said grab bar, said grab bar including relatively movable first and second members arranged to receive and grasp said free end of said strap material extending from said tensioned supply thereof adjacent said strap feed station and to pull a predetermined length of strap material from said supply thereof as said grab bar moves to said strap seal station to hold said strap material in a tensioned condition adjacent said electrode bar for dielectric sealing to said base material.

20. An apparatus as set forth in claim 19, wherein said first and second members of said grab bar are relatively movable between an opened position to provide an opening for receiving or releasing said strap material and a closed position to restrict said opening for grasping said strap material therein.

21. An apparatus as set forth in claim 20, wherein a plurality of said electrode bars are mounted to said first platen, said tensioned supply of strap material provides a plurality of said free ends, each of said free ends being associated with one of said electrodes, and said grab bar provides a plurality of said openings, each of said openings being associated with one of said free ends and its associated electrode bar.

22. An apparatus as set forth in claim 20, wherein said first and second members of said grab bar are telescopically arranged and relatively rotatable between said opened and closed positions.

23. An apparatus as set forth in claim 20, wherein said first and second members of said grab bar are normally resiliently biased to said closed position and actuation means operable between said grab bar and first platen are provided for moving said first and second members to said opened position.

24. An apparatus as set forth in claims 19, 20, or 22, wherein said electrode bar includes sealing surface means and said strap feeder assembly includes retractable strap aligning guides extending along opposite sides of said electrode bar, said guides projecting from said electrode bar beyond said sealing surface means to receive and align said strap material with said sealing surface means of the electrode bar and to retract during dielectric sealing.

25. An apparatus for dielectrically sealing a strap of relatively flexible material to a base sheeting material of predetermined width and arbitrary length comprising a press including a frame for supporting a fixed platen and a movable platen having an electrode bar mounted thereto, said electrode bar having sealing surfaces disposed in a plane, said platens being operable between a spaced open position for material feed and a substantially adjacent closed position for dielectric sealing, dielectric heat sealing means connected between said electrode bar and fixed platen, means for advancing said base material in a lengthwise direction in predetermined increments along said fixed platen and transversely of said electrode bar, and a strap feeder assembly to feed and position strap material in alignment with said electrode bar for dielectric sealing to said base material, said strap feeder assembly comprising traveler means mounted to said movable platen for movement therewith and arranged to reciprocate a grab bar back and forth between a strap feed station adjacent a first lateral edge of said base material and a strap seal station adjacent an opposite second lateral edge of said base material, strap threader means arranged to feed a free end of said strap material extending from a tensioned supply thereof to said grab bar, said grab bar including relatively movable first and second members operable between an opened position for receiving and releasing strap material and a closed position for grasping strap material, said grab bar being arranged to receive and grasp said free end of said strap material extending from said tensioned supply thereof adjacent said strap feed station and to pull a predetermined length of strap material from said supply thereof as said grab bar moves to said strap seal station to hold said strap material in a tensioned condition against said electrode bar for dielectric sealing to said base material.

26. An apparatus as set forth in claim 25, wherein said strap feeder assembly includes retractable strap aligning guides extending along opposite sides of said electrode bar and projecting beyond said plane of said electrode bar sealing surfaces to receive and maintain said strap in alignment with said sealing surfaces and to retract during dielectric sealing.

27. An apparatus as set forth in claims 25 or 26, wherein said traveler means includes a pair of spaced apart, endless conveyor chains having said grab bar mounted between them, and said grab bar is reciprocated along a lower run of said conveyor chains and a portion of an arcuate run adjacent each end of said lower run.

28. A process for bonding a strap of a dielectrically heat sealable material to a base sheeting material of predetermined width and arbitrary length comprising positioning said base material between a pair of platens which are relatively movable between a spaced opened position for material feeding and a substantially adjacent closed position for dielectric sealing, one of said platens carrying an electrode bar having sealing surfaces in a plane extending in a direction across the width of said base material, feeding a free end of said strap material extending from a tensioned supply thereof with a strap threader means having a surface terminating at a feed edge by supporting said strap material along said surface and advancing said free end over said feed edge, grasping said free end of said strap material with a grab bar positioned at a strap feed station adjacent a first lateral edge of said base material, advancing said grab bar to a strap seal station adjacent an opposite second lateral edge of said base material and pulling a predetermined length of strap material from said supply thereof to position said strap material in alignment along said electrode bar, stopping said grab bar at said strap seal station and holding said strap material in a tensioned condition adjacent said electrode bar, and closing said platens to dielectrically heat seal said strap material to said base material, severing said strap material adjacent said first lateral edge of said base material and downstream of said tensioned supply thereof to provide a further free end of said strap material, operating said grab bar to release said first-mentioned free end of said strap material, and moving said platens to said opened position and returning said grab bar to said strap feed station.

29. A process as set forth in claim 28, wherein the step of holding said strap material adjacent said electrode bar includes disposing said strap material between retractable strap aligning guides extending along said electrode bar and projecting beyond said plane of said sealing surfaces to laterally confine said strap material until it is bonded to said base material.

30. A process as set forth in claims 28 or 29 wherein the step of holding said strap material adjacent said electrode bar includes tensioning said strap material between points offset from said plane of said sealing surfaces of the electrode bar to bias said strap material against said sealing surfaces.

31. A process for making roll stock of laminar sheet material comprising a base sheeting material of predetermined width and arbitrary length having transversely extending straps of a relatively flexible material dielectrically heat sealed thereto at spaced locations along the length of said base material comprising advancing said base material lengthwise in predetermined increments over a fixed platen disposed below a movable platen carrying a transversely extending electrode bar having sealing surfaces disposed in a plane, feeding a free end of said strap material extending from a tensioned roll supply thereof with a strap threader means having a surface terminating at a feed edge by supporting said strap material along said surface and advancing said free end over said feed edge, grasping said free end of said strap material with a grab bar at a strap feed station located adjacent a first lateral edge of said base material, moving said grab bar in a first direction across the width of said base material to pull a predetermined length of said strap material from said roll supply thereof and to position said strap material underneath said electrode bar, stopping said grab bar at a strap seal station located adjacent an opposite second lateral edge of said base material with said strap material extending in a tensioned condition between said roll supply and grab bar and disposed in alignment adjacent said electrode bar sealing surfaces, closing said platens and dielectrically sealing said strap material to said base material, severing said strap material at said strap feed station and downstream of said tensioned roll supply to provide another free end of said strap material, releasing said first-mentioned free end of said strap material at said strap seal station, and opening said platens and returning said grab bar to said strap feed station.

32. A process as set forth in claim 31, wherein said electrode bar has sealing surfaces disposed in a plane and the step of holding said free end of said strap material at said strap seal station includes disposing said strap material between retractable strap aligning guides extending along said electrode bar and projecting beyond said plane of said sealing surfaces to laterally confine said strap material until it is bonded to said base material.

33. A process as set forth in claims 31 or 32 wherein the step of holding said strap material at said strap seal station includes tensioning said strap material between points offset from said plane of said sealing surfaces of the electrode bar to bias said strap material against said sealing surfaces.

* * * * *

UNITED STATES PATENT AND TRADEMARK OFFICE
CERTIFICATE OF CORRECTION

PATENT NO. : 4,323,409
DATED : April 6, 1982
INVENTOR(S) : Rudolph Alt

It is certified that error appears in the above—identified patent and that said Letters Patent is hereby corrected as shown below:

On the title page, Item [45] "April 6, 1981" should read --April 6, 1982--;

Column 1, line 43, "materials" should read --material--; and

Column 8, line 22, "which" should read --when--.

Signed and Sealed this

Thirteenth Day of July 1982

[SEAL]

Attest:

Attesting Officer

GERALD J. MOSSINGHOFF

Commissioner of Patents and Trademarks